United States Patent [19]

Shimizu et al.

[11] Patent Number: 4,751,629
[45] Date of Patent: Jun. 14, 1988

[54] OUTPUT POWER REGULATING SYSTEM FOR A PORTABLE ENGINE POWERED ELECTRIC GENERATOR

[75] Inventors: Motohiro Shimizu; Takashi Kurata, both of Saitama, Japan

[73] Assignee: Honda Giken Kogyo Kabushiki Kaisha, Tokyo, Japan

[21] Appl. No.: 52,236

[22] Filed: May 19, 1987

[30] Foreign Application Priority Data

May 28, 1986 [JP] Japan ................................ 61-80738

[51] Int. Cl.⁴ .................................. H02M 5/548
[52] U.S. Cl. ......................................... 363/37; 322/1; 322/90
[58] Field of Search .................. 322/1, 90; 363/37

[56] References Cited

U.S. PATENT DOCUMENTS 4,115,729 9/1978 Young et al. .................... 363/37
4,164,785 8/1979 Young et al. .................... 363/37

FOREIGN PATENT DOCUMENTS 132398 9/1984 Japan .
185831 5/1985 Japan .
257795 12/1985 Japan ........................................ 322/1

Primary Examiner—William H. Beha, Jr.
Attorney, Agent, or Firm—Lyon & Lyon

[57] ABSTRACT

A power regulating system for a portable engine powered AC-DC-AC electric generator system wherein an auxiliary generator winding powers voltage regulation and frequency determining circuitry and controls a thyristor bridge circuit employed for rectifying the output of a three-phase primary winding of the generator.

12 Claims, 2 Drawing Sheets

OUTPUT POWER REGULATING SYSTEM FOR A PORTABLE ENGINE POWERED ELECTRIC GENERATOR

FIELD OF THE INVENTION

The present invention is directed to an output power regulating system for a portable engine powered electric generator wherein an output of an alternating current ("AC") generator driven by an engine is rectified, and an AC output having a predetermined frequency is produced by means of an inverter.

BACKGROUND

Portable devices for producing AC electric power in the field which combine a relatively small engine generator are well known in the art and are utilized for leisure, outdoor construction work and as a power source for emergency use.

In an engine powered electric generator ("engine generator") of this general type, it is desirable to provide the load with an AC output having both a stable output frequency and a stable output voltage. Such stable output frequency and voltage must be maintained over a wide range of possible loads. In typical use, the load on an engine generator may vary over time as the load is cycled through different duty levels.

Generally, a synchronous AC generator has been employed in an engine generator. The relation of $n = 120 \, f/p$ is well known in the art where "n" is the rotational rate of the engine in revolutions per minute, "f" is the electrical output frequency of the AC generator in Hertz, and "p" is the number of magnetic poles of the generator. Bipolar or tetrapolar generators are commonly used. For example, the speed of rotation of the engine is kept at approximately 3000 rpm (or approximately 3600 rpm) in a bipolar type generator in order to obtain a stable AC output of 50 Hz or 60 Hz, respectively. As a result, in AC generators where output frequency is determined by the rotational speed of the generator, a larger generator is required to obtain a larger output. However, under these conditions, the rotational speed of the engine may be comparatively low and its operational efficiency may not be optimized. Furthermore, the rotational speed of the engine tends to fluctuate due to load variations or engine pulsation making it difficult to maintain a constant electrical output frequency.

To cope with this problem, some recent engine generators have been miniaturized and their operational efficiency enhanced by permitting higher rotational velocity. To stabilize the electrical output, the output of the AC generator is rectified to Direct Current ("DC"), and then converted to AC again with a precise preset frequency independent of the rotational velocity of the engine by means of inverter circuitry. Simultaneously, output voltage is automatically regulated by varying the width of an inverter driving signal with the aid of a feedback signal derived from the output voltage. This type of engine generator is disclosed in the specification of Japanese Laid-Open Patent Application No. 82098/1985.

In the prior art engine generator in which the output voltage is stablized by the above-described feedback control, however, the circuits necessary to achieve such control are complex and the voltage regulation does not account for fluctuations in output voltage due to pulsation of the engine or to a sharp increase in output voltage. Such engine pulsation or sharp increase in output voltage can occur due to an increase in the velocity of rotation of the generator. This is, in turn, caused by the engine's governor when the output load changes abruptly.

Furthermore, in the conventional engine generator which utilizes the aforementioned inverter, if the load is connected to the output of the inverter while the engine generator is in a transient state of increasing output voltage, as for example, at start up, a semiconductor switch element such as a transistor at an output stage of the inverter may suffer a shortage of bias current potentially causing improper output. Moreover, if a commutation command or signal with a predetermined frequency is generated by applying a voltage obtained from the rectified output of the generator to drive the inverter, the frequency of the commutation signal sent from an oscillator circuit while the engine generator output voltage is in a transient state of increasing output voltage may become unstable in some cases. Such problems may also occur when the output voltage falls due to stoppage of the engine generator. Accordingly, an improved power regulating system for a portable engine powered electrical generator would be desirable.

SUMMARY OF THE INVENTION

In accordance with the primary object of the present invention, in an engine powered electric generator equipped with an inverter, a highly responsive and simply constructed power regulating system for stablizing output voltage is provided. In one aspect of the invention, a power regulating system is provided which makes use of an auxiliary winding on the generator to provide stable power to electronic voltage output and frequency control circuitry in order to prevent output abnormalities. In another aspect of the invention, the continuity angles of thyristors in a Fullwave Bridge Rectifier Circuit are controlled and regulate the output voltage prior to input to the inverter stage. Other and further aspects of the invention will be apparent to those skilled in the art.

DETAILED DESCRIPTION OF THE PREFERRED EMBODIMENT

Figure 1:
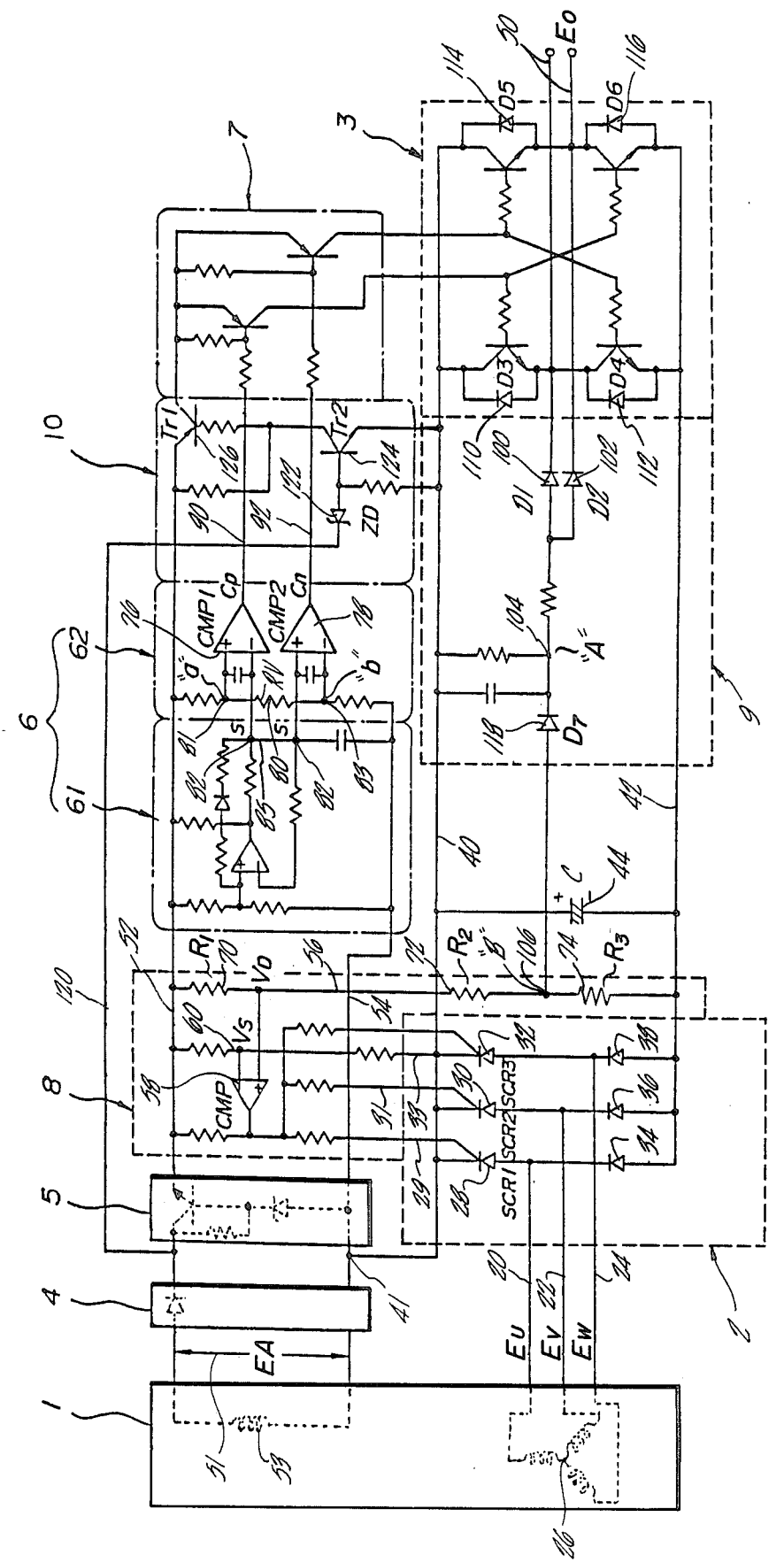
FIG. 1 is a schematic drawing of the engine generator output power regulating circuit.

Turning now in detail to the drawings, FIG. 1 is a schematic diagram showing the electrical circuits of an engine powered electric generator according to a preferred embodiment of the present invention. Upon rotation by an engine (not shown) which may be any type of source of rotational movement, such as, for example, a small gasoline or diesel powered internal combustion engine, the windings 26 of electric generator 1 provide three-phase electric power outputs Eu 20, Ev 22 and Ew 24 to three-phase full wave rectifier bridge circuit 2 (hereinafter "Fullwave Rectifier Bridge Circuit" or "Thyristor Bridge Circuit") which consists of silicon controlled rectifiers ("thyristors") SCR1, 28, SCR2, 30 and SCR3, 32 and diodes 34, 36 and 38 configured in a bridge circuit as shown in FIG. 1. As shown in FIG. 1, the cathodes of SCR1, 28, SCR2, 30, and SCR3, 32 are electrically connected to line 40. The anode of SCR1, 28 is electrically connected to Eu, 20 and the cathode of diode 34. The anode of SCR2, 30 is electrically connected to Ev, 22 and the cathode of diode 36. The anode of SCR3, 32 is electrically connected to Ew, 24 and the cathode of diode 38. The anodes of diodes 34, 36 and 38 are elecrically connected to line 42. Outputs on lines 40 and 42 of Fullwave Rectifier Bridge Circuit 2 are filtered by filter capacitor C, 44 which may be an electrolytic capacitor having its positive terminal electrically connected to output line 40 and its negative terminal electrically connected to output line 42 as well known in the art. Filtered DC output is available between lines 40 and 42 and is input to a bridge-type Inverter Circuit 3 which outputs AC power having a constant frequency as AC output Eo, on lines 50 ("AC output Eo"). The output frequency of AC output Eo, 50 is determined by Oscillator Circuit 6 as discussed below.

A control system for Inverter Circuit 3 is constructed in such a way that a single-phase output Ea 51 from auxiliary winding 53 of AC generator 1 is rectified by means of Rectifier Circuit 4, which, in a preferred embodiment, consists of a single diode arranged in the conventional manner. The auxiliary winding is provided in order to obtain electric power from a source different from the three-phase windings 26 of generator 1. Oscillator Circuit 6 is powered by a regulated fixed DC voltage across lines 52 and 54 which is provided by a conventional constant voltage circuit 5 as well known in the art. Other arrangements for circuits 4 and 5 are possible as is well known in the art. Commutation signals Cp and Cn each having a constant frequency in both positive and negative directions respectively are produced by Oscillator Circuit 6 in the conventional manner on lines 90 and 92, respecively; and Inverter Circuit 3 is driven by Inverter Controlling Circuit 7 in response to commutation signals Cp and Cn.

Fullwave Rectifier Bridge Circuit 2 is a thyristor bridge circuit. Constant Voltage Regulator Circuit 8 controls the rectification output of the three-phase winding 26 of generator 1 and regulates it to a constant voltage by controlling the continuity angles of individual thyristors SCR1, 28, SCR2, 30 and SCR3, 32 by controlling the voltage on their respective gates on lines 29, 31 and 33, respectively. Inverter Output Voltage Detection Circuit 9 detects fluctuations in AC output voltage Eo 50 of Inverter Circuit 3 and sends a signal $V_D$, on line 56 to Constant Voltage Regulator Circuit 8. Signal $V_D$, on line 56 is capable of changing the output voltage of Fullwave Rectifier Bridge Circuit 2 by changing the output of comparator 58 in a direction in which the voltage fluctuations are controlled.

Constant Voltage Regulator Circuit 8 serves to detect the output voltage of Fullwave Rectifier Bridge Circuit 2 and controls the continuity angles of the respective thyristors SCR1, 28, SCR2, 30 and SCR3, 32 in accordance with the comparison output of comparator 58 so as to obtain a relation of $V_D=V_S$ while comparing the detection voltage $V_D$, on line 56 with the reference voltage $V_S$, on line 60.

Output line 40 of Fullwave Rectifier Bridge Circuit 2 is electrically connected to Rectifier Circuit 4 at Node 41 in the control system so as to assume a common potential. The output voltage of Fullwave Rectifier Bridge Circuit 2 and Constant Voltage Regulator Circuit 8 are divided by resistances R1, 70, R2, 72, and R3, 74 which are connected in series between lines 52 and 42, whereby they are detected as the detection voltage $V_D$ on line 56. Thus, the output voltage of Fullwave Rectifier Bridge Circuit 2 and the output voltage of the control system are combined and monitored.

With the foregoing arrangement, it is possible to monitor and regulate the output voltage of Fullwave Rectifier Bridge Circuit 2 in such a way that the power supplied to the control system does not undergo voltage fluctuations which would tend to cause comparator 58 to generate erroneous signals. Therefore, since the control voltage input to Inverter Circuit 3 is regulated, it is possible to simplify the control system and to perform a constant-voltage regulation operation having high responsivity, as contrasted with a conventional method wherein the voltage at the output of the inverter is regulated under feedback control. Morevoer, inasmuch as the control system for controlling thyristors SCR1, 28, SCR2, 30 and SCR3, 32 in Fullwave Rectifier Bridge Circuit 2 is powered from auxilliary winding 53 of AC generator 1, gate signals of the individual thyristors SCR1, 28, SCR2, 30 and SCR3, 32 can always be obtained as long as the generator is turning, and thus even when the output voltage of the generator decreases somewhat gate control signals will still be generated. The continuity angles corresponding to the fluctuations in output voltage of the generator for thyristors 28, 30 and 32 in Fullwave Rectifier Bridge Circuit 2 are controlled and hence it is possible to simultaneously accomplish both the fullwave rectification of the output of the generator and the Constant Voltage regulation of the rectified output. In such a case, thyristors 28, 30 and 32 perform not the phase-control but the control of continuity angles by merely making the most of the fluctuations in level of voltage, and the continuity degree may be varied in response to even the slightest fluctuation in output voltage of the generator such as that produced by ripples, thereby enabling rapid adjustment to achieve a stable voltage.

Figure 2:
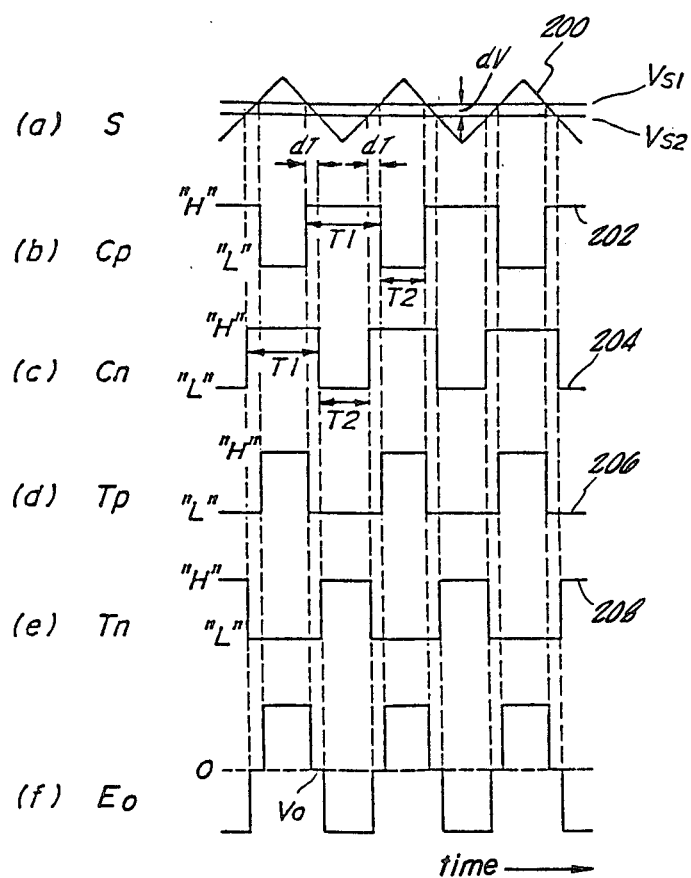
FIG. 2 is a timing diagram relating to the inverter circuitry signals.

Oscillator Circuit 6 is composed of a Triangular Wave Oscillator Circuit 61 for generating on line 85 a Triangular Wave Signal S shown at 200 on FIG. 2 having a constant frequency. Signal S, 200 is input to Waveform Transforming Circuit 62 on line 85 for generating pulse-type commutation signals in both positive and negative directions based on Triangular Wave Signal S, 200.

The waveform transforming circuit 62 consists of a comparator CMP1, 76 in which a comparison reference parallelly disposed on the side of the output of Triangular Wave Oscillator Circuit 61 is provided on the side of positive polarity and of a comparator CMP2, 78 whose comparison reference is provided on the side of negative polarity. A bias resistance Rv, 80 is provided between comparison reference points "a", 81 and "b", 83 of the comparators CMP1, 76 and CMP2, 78. Referring to FIG. 2, if the comparison reference level of the comparator CMP1, 76 is denoted Vs1, 202 and the comparison reference level of the comparator CMP2, 78 is denoted Vs2, 204, the comparison reference levels of comparators CMP1, 76 and CMP2, 78 are set so as to satisfy the inequality Vs1>Vs2 as shown in FIG. 2.

Triangular Wave Signal S, 200, shown in FIG. 2(a), which is transmitted from the triangular Wave Oscillator Circuit 61, is inputted to the individual comparators CMP1, 76 CMP2, 78 of Waveform Transforming Circuit 62. In the comparators CMP1, 76, CMP2, 78 the signals S, at nodes 82 on line 85 in FIG. 1 are compared with the reference levels Vs1 and Vs2 in the positive and negative directions, thereby obtaining the commutation signals Cp and Cn on lines 90 and 92, respectively, in the positive and negative directions which are respectively converted into pulse-type signals having the timing characteristics illustrated in FIGS. 2(b) and 2(c), respectively. The commutation signal Cp in the positive direction and the commutation signal Cn in the negative direction are in antiphase with respect to each other. A difference 2t corresponding to a bias voltage "v" caused by the foregoing resistance Rv 80 is created between a high-level period T1 and a low-level period T2 in the commutation signals Cp and Cn.

Inverter Controlling Circuit 7 transmits commutation signals Tp and Tn illustrated in FIGS. 2(d) and 2(e) as 206 and 208, respectively, in the positive and negative directions. These are never both high on input to Inverter Circuit 3 as shown at FIGS. 2(d) and 2(e), 206 and 208. Each of the commutation signals Tp and Tn is a pulse train having a commutation ON period T2, and a time-difference dt is produced between the commutation signals Tp and Tn.

Accordingly, when sequentially performing switching operations in the positive and negative directions in Inverter Circuit 3 in accordance with the commutation signals Tp and Tn, a pulse wave AC output Eo 50 which is held at a neutral point (zero volt point) $V_O$ during the period dt shown in FIG. 2(f) is obtained from Inverter Circuit 3.

Thus, the comparison references are so set as to have opposite polarity to each other, and waveform transforming circuit 62 may be used which simply consists of a pair of comparators which yield a difference between the comparison reference levels by providing the bias resistance Rv 80 between the comparison reference points, "a", 81 and "b", 83. With this arrangement commutation signals Tp and Tn may readily be generated in the positive and negative directions based on the pulsewave in which the quiescent period dt for preventing a short-circuit caused by a simultaneous ON operation is formed between the signals in the positive and negative directions that are in a commutation ON-state in accordance with the triangular wave signals S each having a constant frequency that are transmitted from Triangular Wave Oscillator Circuit 61. The commutation signals Tp and Tn are in antiphase and never overlapped with respect to each other.

The Inverter Output Voltage Detection Circuit 9 detects the AC output voltage Eo 50 of Inverter Circuit 3 through feedback diodes D1, 100 and D2, 102. When a potential at node A 104 which is detected after AC output voltage Eo 50 has risen is lower than that at node B, 106 the potential at node B 106 is lowered in proportion to such a fluctuation. As a result, the output voltage $V_D$ on line 56 of Fullwave Rectifier Bridge Circuit 2 is arranged to apparently exceed the fixed reference voltage $V_S$, and subsequently the output voltage of Fullwave Rectifier Bridge Circuit 2 is decreased to a predetermined value under control of Constant Voltage Regulator Circuit 8. It is to be noted that in a preferred embodiment the rectifier bridge comprises feedback diodes D1 100, D2 102 and fly-wheel diodes D3 to D6 110–116 of Inverter Circuit 3. The rectifying operation may, however, be carried out without the use of fly-wheel diodes D3 to D6 (110–112, 114 and 116).

Figure 3:
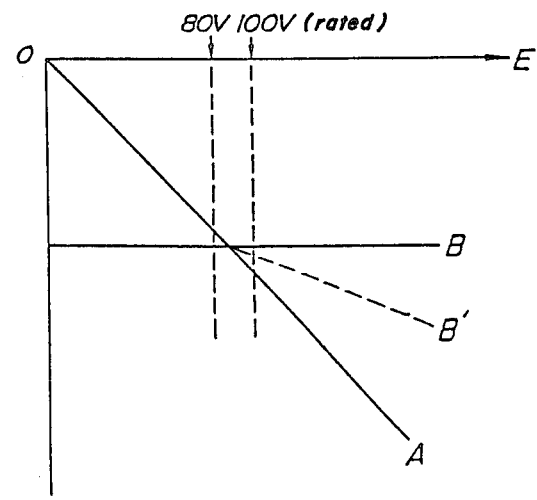
FIG. 3 is a chart showing the relationship between variations in potential at Node A and Node B of FIG. 1.

FIG. 3 is a chart showing the relationship between variations in potential at Node A 104 in the Inverter Output Voltage Detection Circuit 9 and those in potential at Node B 106 in the Constant Voltage Regulator Circuit 8. In the Figure, axis "E" shows the output voltage of Fullwave Rectifier Bridge Circuit 2, "B" indicates characteristics of variation in potential at Node B 106 when the potential at Node A 104 falls after exceeding the potential at Node B 106.

The potential at Node B 106 in Constant Voltage Regulator Circuit 8—the detection voltage $V_D$ on line 86 of the output of Fullwave Rectifier Bridge Circuit 2—is varied in accordance with the detected fluctuations in the AC output voltage Eo 50 of Inverter Circuit 3. Instead, even if the apparent output voltage of Fullwave Rectifier Bridge Circuit 2 is increased by increasing the reference voltage $V_S$ on line 60 of Constant Voltage Regulator Circuit 8 in proportion to the thus detected fluctuations, the same result can be achieved. If diode D7 118 in Inverter Output Voltage Detection Circuit 9 is shorted, when the AC output voltage Eo 50 of Inverter Circuit 3 changes, the apparent output voltage of Fullwave Rectifier Bridge Circuit 2 will fluctuate by changing the reference voltage $V_S$ on line 60 or the potential at Node B 106 in Constant Voltage Regulator Circuit 8 after detecting the fluctuations in AC output voltage Eo 50, whereby such fluctuations in AC output voltage Eo 50 can be compensated for.

On the other hand, if the output voltage of generator 1 is less than a predetermined value, Inverter Protection Circuit 10 will cause inverter commutation signals Tp and Tn which travel between Oscillator Circuit 6 and Inverter Controlling Circuit 7 to cease during the low voltage condition thereby protecting the inverter and the load from damage.

Inverter Protecting Circuit 10 is arranged such that the output voltage of Rectifier Circuit 4 on lines 120 and 40 in the inverter controlling system is detected; when the detected voltage is less than a predetermined Zener voltage which is determined by Zener diode ZD 122, a controlling transistor $Tr_2$, 124 is brought into an OFF-state, thereby turning OFF main switching transistor $Tr_1$, 126; and subsequently the power source circuit of Inverter Controlling Circuit 7 is shut off. In this case commutation signals Cp and Cn on lines 90 and 92, respectively, issued from Oscillator Circuit 6 may be shut off.

According to the above-described circuits, the continuity angles are controlled by Constant Voltage Regulator Circuit 8 so as to correct for fluctuations in the generator output voltage of thyristors 28, 30 and 32 in Fullwave Rectifier Bridge Circuit 2, thereby making it possible to apply the AC voltage to Inverter Circuit 3 in a "pre-regulated" manner by simultaneously accomplishing the fullwave rectification of the generator output and the constant-voltage regulation of the rectified output thereof. Individual thyristors 28, 30 and 32 serve to perform not the phase-control but the control of continuity angles by merely making the most of the fluctuations in level of voltage. Hence, the continuity degree may vary in response to a slight fluctuation in output voltage of the generator which may be caused, for example, by ripples, thereby achieving a regulated voltage ouput from Fullwave Rectifier Bridge Circuit 2.

When AC output voltage Eo 50 of Inverter Circuit 3 fluctuates due to variations in the electric load connected to the output of Inverter Circuit 3, the load having, for example, reactive components causing a temporary overvoltage-state due to counter electromotive forces from the reactive component, AC output voltage Eo 50 may be thereby increased. In such a case, however, an increase in AC output voltage Eo 50 is restrained by reducing the input voltage of Inverter Circuit 3 under control of Constant Voltage Regulator Circuit 8 which follows the operation of detecting the fluctuations in AC output voltage Eo 50 in Inverter Output Voltage Detection Circuit 9. As a result, it is possible to effectively protect both the load and the transistors of Inverter Circuit 3 from the induced overvoltage condition.

Since the voltage on the side of the input of Inverter Circuit 3 is regulated, a key point of the problem of using an inverter is reduced relative to a conventional method wherein the voltage on the side of the output of the inverter would be regulated under feedback control. By virtue of the simple circuit herein described it is possible to accurately and responsively regulate the output voltage.

Furthermore, when the output of generator 1 is too low to supply the proper voltage to the inverter, the inverter is automatically shut off by squelching inverter commutation signals Tp and Tn to prevent a shortage of bias current to Inverter Circuit 3. Moreover, during start-up Inverter Circuit 3 begins to be driven by the control system after oscillator circuit 6 is correctly oscillating and it is therefore possible to apply the commutation signals Cp and Cn each having a predetermined frequency to Inverter Controlling Circuit 7 without causing a disturbance in the oscillation frequency which would be undesirable.

As can be seen from the description set forth above, the present invention yields the following desirable effects. Inasmuch as the power source of the voltage of the electric power supplying system is provided separately from the power source of the control system for controlling the electric power supplying system the voltage of each individual system can be individually optimized and regulated. Problems encountered in conventional systems where control circuitry and output power are supplied by the same generator winding are thus eliminated.

Another advantage of the present invention is that it allows highly responsive voltage regulation of the voltage of the inverter by compensating for both fluctuations in output voltage of the generator and those in output voltage of the inverter due to the influence of the load.

Still another advantage of the present invention is its ability to prevent the inverter from experiencing a shortage of bias current and from suffering damage or improper output due to an under voltage condition by providing a simple circuit for shutting off the inverter when the output voltage of the three-phase winding 26 of generator 1 is lower than a predetermined value.

Thus a novel apparatus for regulating the electrical power output of a portable engine powered electrical generator has been disclosed. While embodiments and applications of this invention have been shown and described it would be apparent to those skilled in the art that many more modifications are possible without departing from the inventive concepts herein. The invention, therefore, is not restricted to the exact specification above.

We claim:

1. A power regulating system for a portable engine generator, comprising an engine; an AC generator; an electric power supply system for outputting a rectification output obtained by rectifying an AC output of said AC generator through an inverter to a load, said AC output having a predetermined frequency; a control system for taking the electric power of a different system from said electric power supplying system out of said AC generator, and controlling said inverter by causing a DC constant-voltage-regulated output to function as a power source, wherein said electric power supply system is provided with a thyristor bridge circuit for rectifying said AC output into said rectification output having a desired value, said control system capable of detecting a voltage value obtained by superposing an output voltage of said thyristor bridge circuit with a power source voltage of said control system, and the rectification output supplied to said inverter is kept at a substantially constant level of voltage by controlling said thyristor bridge circuit in accordance with fluctuations in said voltage value.

2. A power regulating system for a portable engine generator as set forth in claim 1, wherein said power regulating system includes a first detection means for detecting an output voltage of said thyristor bridge circuit, and keeping the output voltage of said thyristor bridge circuit at a substantially constant level of voltage by controlling a continuity angle of a thyristor of said thyristor bridge circuit in response to a comparison signal for comparing the detected voltage with a preset reference voltage; and a second detection means for detecting the fluctuations in output voltage of said inverter, and varying the output voltage of said invertor in such a direction that the fluctuations in output voltage of said inventor are restrained by making the comparison signal of said first detection means variable in accordance with the fluctuations.

3. A power regulating system for a portable engine generator as set forth in claim 2, wherein a detected voltage of the output of said thyristor bridge circuit is arranged to vary in accordance with the detected fluctuations in output voltage of said inverter.

4. A power regulating system for a portable engine generator as set forth in claim 2, wherein a reference voltage is arranged to vary in accordance with the detected fluctuations in the output voltage of said inverter.

5. A power regulating system for a portable engine generator, comprising an engine; an AC generator driven by said engine; an electric power supply system for outputting rectification output obtained by rectifying an AC output of said AC generator through an inverter to a load, said AC output having a predetermined frequency; and a control system consisting of a rectifier circuit for rectifying electric power of a different system from said electric power supplying system by taking the electric power out of said AC generator, a constant-voltage circuit for bringing an output of said rectifier circuit into a constant-voltage, and an inverter controlling circuit for controlling said inverter circuit by causing the thus obtained constant-voltage output to function as a power source, wherein there is provided a circuit for halting supply of inverter commutation signals, transmitted from said inverter controlling circuit for permitting said inverter to perform the commutation, when a detected output voltage of said rectifier circuit is a preset voltage value or less.

6. A power regulating system for a portable engine generator as set forth in claim 5, wherein said invertor controlling circuit supplies the inverted commutation signal to said inverter in accordance with an oscillation frequency of an oscillation circuit powered by a constant-voltage power source provided within said control system.

7. A power regulating system for a portable engine generator as set forth in claims 5 or 6, wherein said supply of inverter commutation signals is halted by disconnecting said inverter controlling circuit from said constant voltage circuit.

8. An output power regulating system for a portable engine powered electric generator comprising
   an engine;
   an AC generator;
   said AC generator mechanically coupled to said engine;
   said AC generator having at least one three-phase winding and at least one auxilliary winding;
   a thyristor bridge circuit electrically connected to the output of said three-phase winding;
   said thyristor bridge circuit including at least three thyristors;
   a rectifier circuit electrically connected to said auxilliary winding;
   a constant voltage circuit electrically connected to said rectifier circuit;
   an oscillator circuit means for generating timing signals;
   said oscillator circuit powered by said constant voltage circuit;
   an inverter controlling circuit electrically connected to said oscillator circuit;
   an inverter circuit;
   said inverter circuit under control of and electrically connected to said inverter controlling circuit and capable of producing an output voltage;
   said oscillator circuit means capable of providing timing signals to said inverter controlling circuit; and
   said timing signals capable of determining an output frequency of said inverter.

9. An output power regulating system as set forth in claim 8 additionally comprising
   a constant voltage regulator circuit;
   said constant voltage regulator circuit capable of adjusting a voltage applied to the gate junctions of said thyristors.

10. An output power regulating system as set forth in claim 9 additionally comprising
    an inverter protection circuit means for interrupting a supply of inverter commutation signals to said inverter upon the occurrence of a low voltage condition in said three-phase winding.

11. An output power regulating system as set forth in claim 10 additionally comprising
    a first detection means for detecting an output of said thyristor bridge circuit,
    said first detection means electically connected to said constant voltage regulator circuit.

12. An output power regulating system as set forth in claim 11 additionally comprising a second detection means for detecting said output voltage said second detection means electrically connected to said first detection means.

* * * * *